United States Patent [19]
Goda

[11] Patent Number: 4,602,726
[45] Date of Patent: Jul. 29, 1986

[54] DISPENSING DEVICE

[76] Inventor: George Goda, 390 First Ave., New York, N.Y. 10010

[21] Appl. No.: 580,152

[22] Filed: Feb. 10, 1984

Related U.S. Application Data

[63] Continuation-in-part of Ser. No. 357,711, Mar. 12, 1982, abandoned, which is a continuation-in-part of Ser. No. 108,804, Dec. 31, 1979, abandoned.

[51] Int. Cl.⁴ .............................................. G01F 11/02
[52] U.S. Cl. .................... 222/321; 222/324; 222/378; 222/381; 222/481
[58] Field of Search ............... 222/162, 321, 324, 378, 222/381, 481; 137/853; 417/550, 566; 604/184

[56] References Cited

U.S. PATENT DOCUMENTS

| | | | |
|---|---|---|---|
| 2,156,023 | 4/1939 | McKay | 604/184 |
| 2,715,980 | 8/1955 | Frick | 137/853 X |
| 2,861,571 | 11/1958 | Sandhage et al. | 604/184 |
| 3,104,448 | 9/1963 | Morrow et al. | 222/381 X |
| 3,131,646 | 5/1964 | Parrott | 417/550 X |
| 3,632,043 | 1/1972 | Kirchmann et al. | 239/157 X |
| 3,682,175 | 8/1972 | Halter | 604/184 |
| 3,827,601 | 8/1974 | Magrath et al. | 222/324 X |
| 4,171,007 | 10/1979 | Bouteille | 137/853 X |
| 4,249,681 | 2/1981 | French | 222/381 X |
| 4,489,861 | 12/1984 | Saito et al. | 137/853 X |

FOREIGN PATENT DOCUMENTS 891908 3/1962 United Kingdom ............... 222/321

Primary Examiner—Joseph J. Rolla
Assistant Examiner—Frederick R. Handren
Attorney, Agent, or Firm—Martin Novack

[57] ABSTRACT

A dispensing device is disclosed which includes a tubular body having front and rear ends, the body having a central bore which narrows at the front thereof to form a tip. A piston is slidable in the bore, the bore space in the body forward of the piston defining a chamber. A supply bottle is removably mounted at the rear of the piston. The piston has a communicating passage between the bottle and the chamber. A first one-way valve means restricts flow in the communicating passage to occur only from the bottle toward the chamber. Also, a second one-way valve means restricts flow as between the chamber and the tip to occur only from the chamber toward the tip. The first one-way valve means includes a hollow valve body having one end which opens into the chamber and at least one port which communicates between the communicating passage and the inner region of the valve body. A tubular resilient element is fitted against the inner surface of the valve body, and acts as a seal, under even very small back pressure.

13 Claims, 2 Drawing Figures

DISPENSING DEVICE

This is a continuation-in-part of U.S. application Ser. No. 357,711, filed Mar. 12, 1982, now abandoned, which is, in turn, a continuation-in-part of U.S. application Ser. No. 108,804, filed Dec. 31, 1979, now abandoned.

BACKGROUND OF THE INVENTION

This invention relates to dispensers and, more particularly, to a hand-held dispensing device which can repeatably deliver a precise quantity of liquid.

There have been previously devised various types of apparatus for repeatably delivering a precise amount of liquid. Many types of hand-held syringes are capable of this task. However, in most cases it is necessary to refill the syringe after each use or to provide a number of different "stop" positions for the syringe plunger. This latter technique requires special operator control and generally yields only a very limited number of samples for each full stroke of the plunger.

Responsive to the need for a repeatable liquid delivery system having the capacity for delivering large numbers of samples without refilling, there have been devices various types of plunger bottle dispensers, examples being disclosed in U.S. Pat. Nos. 3,191,807; 3,430,813; 3,730,398; and 3,741,444. Typically, these units comprise a plunger and a first check valve which allows liquid to pass into a chamber when the plunger is released (i.e., drawn back by action of a biasing sprrng). A second check valve al ows the liquid to be delivered when the plunger is depressed, and a relatively large capacity bottle serves as the source from which liquid is drawn in through the first check valve. This type of bottle dispenser system is found to operate satisfactorily in some applications, but there is a degree of inconvenience associated with the size and bulk of the bottle and the frequent necessity of bringing test tubes or vessels to the vicinity where the bottle is located.

In my U.S Pat. No, 4,046,291, there is disclosed a device for pipetting and/or diluting wherein the supply of liquid reagent is integral with the device itself; i.e., the supply of reagent is contained within an enclosure defining a back chamber of the device which surrounds the plunger. The plunger has a communicating passage between the back chamber and a front chamber that is in front of the plunger. A one-way valve restricts flow in the communicating passage to occur only from the back chamber toward the front chamber. When the plunger is released, the liquid reagent is drawn into the front chamber, and thereafter it is dispensed when the plunger is depressed. Each time the plunger is released, an aliquot of reagent is drawn into the front chamber for subsequent dispensing.

It is an object of the present invention to provide a dispensing device of the type disclosed in my above-referenced U.S. Pat. No, 4,046,291, but which is an improvement thereon. In particular, it is an object of the invention to provide a hand-held dispenser which can repeatably deliver a precise quantity of liquid reagent and has an improved valve system, which is easy to load with a bulk supply of such reagent, which has improved venting of the reagent supply, and which is easy to handle and use, with little manual dexterity being required.

SUMMARY OF THE INVENTION

The present invention is directed to an improved dispensing device which includes a tubular body having front and rear ends, the body having a central bore which narrows at the front thereof to form a tip. A piston is slideable in the bore, the bore space in the body forward of the piston defining a chamber. A supply bottle is removably mounted at the rear of the piston. The piston has a communicating passage between the bottle and the chamber. A first one-way valve means restricts flow in the communicating passage to occur only from the bottle toward the chamber. Also, a second one-way valve means restricts flow as between the chamber and the tip to occur only from the chamber toward the tip.

The first one-way valve means includes a hollow valve body having one end which opens into the chamber and at least one port which communicates between the communicating passage and the inner region of the valve body. A tubular resilient element is fitted against the inner surface of the valve body, and acts as a seal, under even very small back pressure.

A feature of the present invention is this first one-way valve positioned at the front of the piston, which, for accurate dispensing, must readily allow the flow of liquid into the front chamber at forward pressure, but must seal completely, without leakage, at even very low back pressure. This is achieved in the present invention with a valve that is still compact enough to fit into the piston head.

In the preferred embodiment hereof, the combination of the use of the defined first one-way valve, with a sleeve-type valve as the second one-way valve, is particularly advantageous in providing for a leakage-free front chamber.

In accordance with a further feature of the invention, the mounting means for the supply bottle comprises a bottle cap mounted at the rear end of the piston, with the communicating passage passing therethrough. A venting aperture is provided in the cap adjacent to the communicating passage, and a third one-way valve is provided in the venting aperture, to allow the flow of air into the bottle. A baffle extends rearwardly from the rear portion of the communicating passage, and has a lip above the venting aperture which is operative to deflect air bubbles from the venting aperture away from the communicating passage. This has been found to be an effective solution to the problem which arose when air from the venting aperture entered the communicating passage and thereby adversely affected the accuracy of the dispenser.

Further features and advantages of the invention will become more readily apparent from the following detailed description when taken in conjunction with the accompanying drawings.

DESCRIPTION OF THE PREFERRED EMBODIMENT

Figure 1:
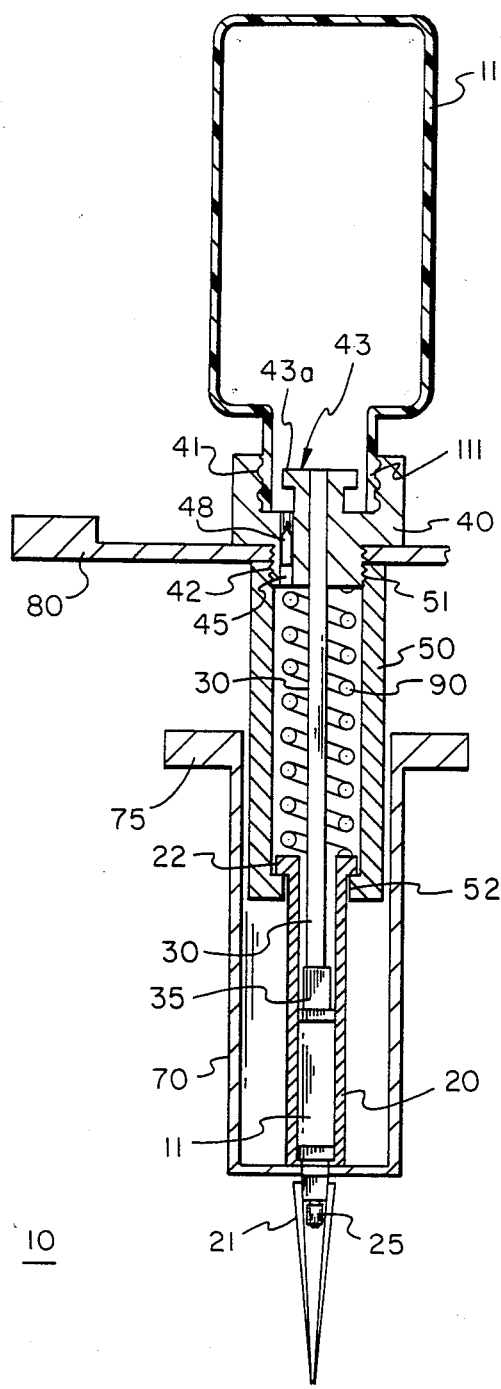
FIG. 1 is a vertical cross-section, except for piston and valves which are shown in perspective, through a dispensing device in accordance with an embodiment of the invention, the device being shown with the piston in the released or drawn back position.
Figure 2:
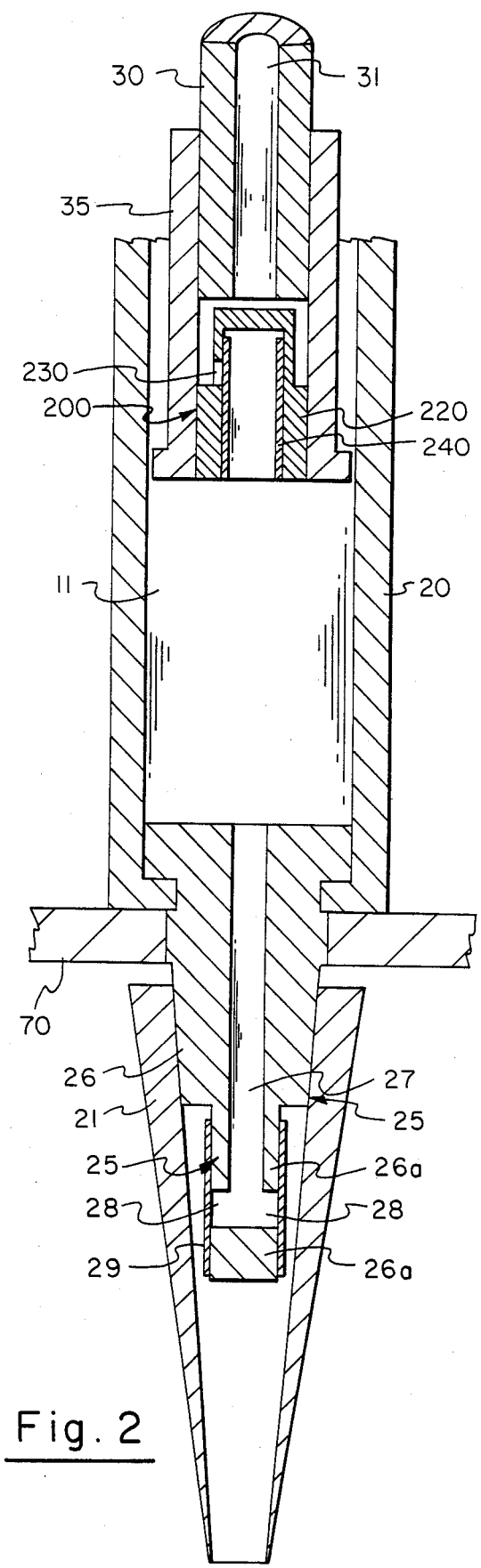
FIG. 2 is an enlarged cross-section of the piston head, chamber, and valves.

Referring to FIGS. 1 and 2, there is shown an embodiment of a dispensing device 10 in accordance with the invention. A tubular body narrows at the front end thereof to form a dispensing tip 21, which may be integral therewith or a separate piece. A piston 30 has a piston head 35 that is slideable in the bore of the tubular body 20. In the illustration of FIGS. 1 and 2, the piston is shown in its normally withdrawn position. The bore space in front of the piston is called a chamber 11. Mounted at the rear of piston 30, or alternatively formed integrally therewith, is an annular connector piece 40, which, in the present embodiment, serves as an inverted bottle cap. The cap 40 has inner threading 41 at its rear internal end and outer threading 42 at its front external end. The rear threading 41 of connector piece 40 receives the threading 111 at the opening of a reagent-containing supply bottle 110. A cylindrical rear body 50 is provided with internal threading 51 at its rear end and an internal rim 52 at its front end. The rear internal threading 51 engages the front threading 42 of cap 40, so the rear body 50 is effectively coupled to the piston 30 and moves in concert therewith. The front internal rim 52 of the rear body 50 is slideable along the outside of the body 20 and engages a rear outer rim 22 of body 20 to define and limit the piston withdrawn position.

The piston 30 has a communicating passage 31 between the mouth of bottle 110 and the chamber 11. A one-way valve 200 is disposed in the piston head 35 at the front end thereof, and restricts flow of fluid in the passage 31 to the direction from the bottle 110 into the chamber 11. The one-way valve 200 includes a generally cylindrical hollow valve body 220 which is fit into piston head 35. The valve body 220 is opened at its front end 221 and has one or more ports 230 in its rear portion, which is of smaller outer diameter than its front portion. A tubular resilient element 240, which may be a silicone rubber membrane, is fitted against the inner surface of the valve body and, in the absence of forward pressure, or under back pressure, seals off the port(s) 230. Under forward pressure, liquid in passage 31 flows around the rear outer portion of valve body 220, through port(s) 230, and between the membrane 240 and the inner wall of the valve body, into chamber 11.

Another one-way valve 25 is mounted forward of the chamber 11 and permits flow of liquid only in the direction from the chamber 11 toward the tip 21 and then the outside environment. In the present embodiment the one-way valve 25 is a sleeve-type check valve which includes a valve body 26 having a front necked portion 26a and a central bore 27, which communicates with side ports 28. A resilient sleeve 29, typically formed of rubber, surrounds the lower portion of valve body 26 and covers the ports 28. Liquid in the chamber 11 under forward pressure can be forced into the tip 21 by passing through the bore 27, side ports 28, and then beneath the lower portion of resilient sleeve 29, which is forced out slightly. However, fluid in the tip cannot flow backwards into the chamber 11 since the sleeve 29 will cling to body 26 in this circumstance.

A coil spring 90 surrounds the piston 30. The spring is confined at its upper extreme by cap 40 and confined at its bottom extreme by the rim 22 of body 20. The spring 90 normally urges the piston 30 rearwardly in the body 20 and thereby normally biases the piston 30 to its "released" position at the top of its stroke.

A generally cylindrical sleeve 70 is coupled to the front of body 20 and extends rearwardly to receive the rear body 50, which is slideable therein. An index-finger-supporting flange 75 extends laterally from the rear of sleeve 70. A thumb-operable lever 80 has a circular hole which fits around the front neck portion of cap 40 and is therefore retained between the cap 40 and the back edge of rear body 50.

The cap 40 has a venting aperture 45 that is adjacent the communicating passage 31. A lip valve 48 is mounted in the aperture 45, and allows air to enter under forward pressure to replace liquid removed from the bottle. A baffle 43, which is preferably formed integrally with the cap 40, extends rearwardly around the rear portion of the communicating passage, and has a lip 43a which extends above the opening of aperture 45.

In operation of the dispensing device of the invention, assume that the piston 30 is at the top of its stroke (released) and that the chamber 11 is filled with the liquid to be dispensed. An operator holds the dispenser in the palm of the hand, with the thumb on lever 80, and the fingers gripping the sleeve 70 with the index finger pressing against flange 75. Pressing on the thumb lever causes the forward stroke of the piston 30 which is coupled to the rear body 50, cap 40, and the piston 30. The liquid in the chamber is thereby dispensed, such as into a receiving test tube (not shown). One-way valve 200 prevents back flow of liquid toward the source. When the manual force is released at the bottom of the stroke, the spring 90 causes return of the piston 30 to the normal released position at the top of the stroke. As the piston returns to the top of its stroke, atmospheric pressure causes fluid from the bottle to be drawn through the communicating passage 31 in piston 30 and through one-way valve 200 into the chamber 11. The chamber is thereby refilled. During this operation, a displacing amount of air enters bottle 110. The one-way valve 25 prevents air from entering the front chamber through the tip. The lip 43a on baffle 43 has been found very useful in overcoming the problem of vented air entering the chamber during the upward stroke of the piston, which had caused dispensing inaccuracy. The lip deflects air bubbles away from communicating passage 31.

There are various ways in which the described structural elements can be formed. The illustrated embodiment can be constructed essentially of molded or machined plastic parts (except for such parts as resilient valve materials, springs, and seal materials), but other suitable materials, such as stainless steel, can be employed.

The invention has been described with reference to a particular embodiment, but variations within the spirit and scope of the invention will occur to those skilled in the art. For example, while a representative tip configuration has been disclosed, it will be understood that other tip configurations, such as are suitable for engaging the mouth of a receiving vessel, can be utilized.

I claim:
1. A dispensing device, comprising:
   a tubular body having front and rear ends, said body having a central bore which narrows at the front thereof to form a tip;
   a piston slideable in said bore, the bore space in said body forward of tne piston defining a chamber;
   a supply bottle removably mounted in common with said piston and being moveable therewith;

said piston having a communicating passage between said bottle and said chamber;

first one-way valve means at the front of said piston restricting flow in said communicating passage to occur only from said bottle toward said chamber, said first one-way valve means including a hollow valve body having one end which opens into said chamber and at least one port which communicates between the communicating passage and the inner hollow region of the valve body, and a tubular resilient element fitted against the surface of the hollow region of said valve body;

second one-way valve means restricting flow as between said chamber and said tip to occur only from said chamber toward said tip; and the means by which said supply bottle is removably mounted comprising a bottle cap mounted at the reat end of said piston with said communicating passage passing therethrough, said cap having a venting aperture adjacent said communicating passage, a third one-way valve means in said venting aperture, and a baffle extending rearwardly around the rear portion of said communicating passage and having a lip above said venting aperture with is operative to deflect air bubbles from said venting aperture away from said communicating passage.

2. The device as defined by claim 1, wherein said second one-way valve means comprises a sleeve-type valve disposed in the tip portion of said tubular body.

3. The device as defined by claim 1, further comprising a hollow rear body which is coupled to said cap and has a front open portion which slides over said tubular body.

4. The device as defined by claim 2, further comprising a hollow rear body which is coupled to said cap and has a front open portion which slides over said tubular body.

5. The device as defined by claim 3, further comprising a spring located within said rear body and surrounding said piston, said spring being operative to bias said piston toward its rearmost position with respect to the chamber.

6. The device as defined by claim 4, further comprising a spring located within said rear body and surrounding said piston, said spring being operative to bias said piston toward its rearmost position with respect to the chamber.

7. The device as defined by claim 5, further comprising a sleeve coupled to the front of said tubular body, and extending rearwardly therefrom to slidably receive, at its rearward open end, said rear body.

8. The device as defined by claim 7, further comprising an index-finger-supporting flange laterally extending from said sleeve, and a thumb-operable lever extending laterally, to greater extent than said flange, from the rear of the rear body.

9. A dispensing device, comprising:

a tubular body having front and rear ends, said body having a central bore which narrows at the front thereof to form a tip;

a piston slideable in said bore, the bore space in said body forward of rhe piston defining a chamber;

a supply bottle removable mounted in common with said piston and being moveable therewith;

said piston having a communicating passage between said bottle and said chamber;

first one-wave valve means at the front of said piston restricting flow in said communicating passage to occur only from said bottle toward said chamber;

second one-way valve means restricting flow as between said chamber and said tip to occur only from said chamber toward said tip;

the means by which said supply bottle is removably mounted comprising a bottle cap mounted at the rear end of said piston with said communicating passage passing therethrough, a venting aperture in said cap adjacent said communicating passage, a third one-way valve means in said venting aperture, and a baffle extending rearwardly around the rear portion of said communicating passage and having a lip above said venting aperture which is operative to deflect air bubbles from said venting aperture away from said communicating passage.

10. The device as defined by claim 9, further comprising a hollow rear body which is coupled to said cap and has a front open portion which slides over said tubular body.

11. The device as defined by claim 10, further comprising a spring located within said rear body and surrounding said piston, said spring being operative to bias said piston toward its rearmost position with respect to the chamber.

12. The device as defined by claim 11, further comprising a sleeve coupled to the front of said tubular body, and extending rearwardly therefrom to slidably receive, at its rearward open end, said rear body.

13. The device as defined by claim 12, further comprising an index-finger-supporting flange laterally extending from said sleeve, and a thumb-operable lever extending lateraly, to greater extent than said flange, from the rear of the rear body.

* * * * *